April 29, 1969 K. ROTH ET AL 3,441,773
MERCURY VAPOR RECTIFIER HAVING A POTENTIAL CONTROL ELECTRODE IN LEAD-IN STRUCTURE
Filed July 1, 1966
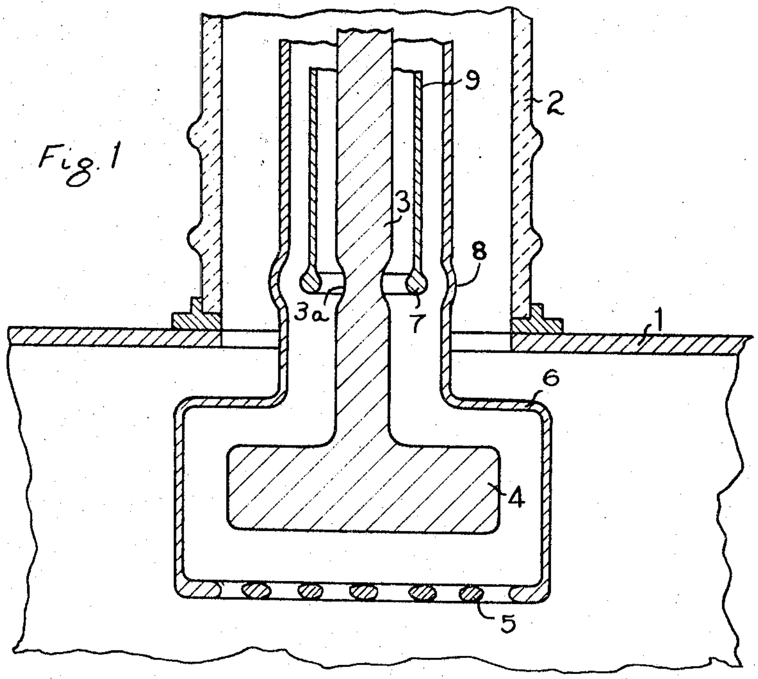
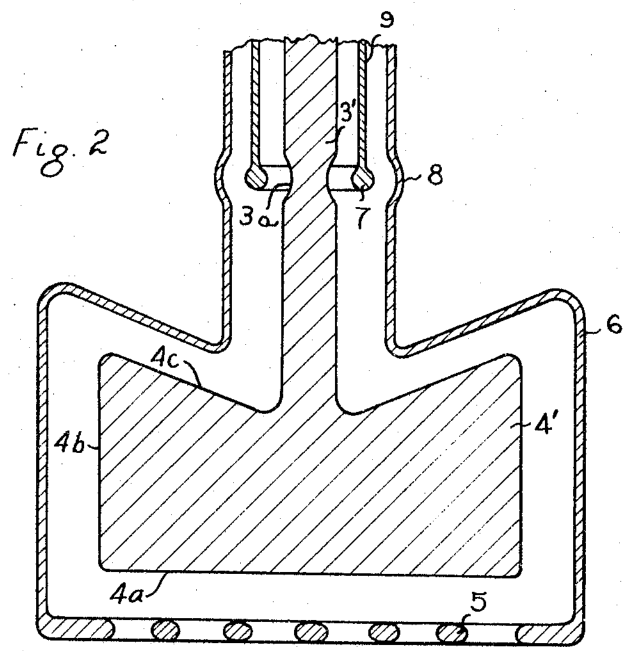
INVENTORS
Karl Roth
Elmar Anwander
Max-Josef Schonhuber
By Pierce, Scheffler & Parker
Attorneys United States Patent Office 3,441,773

Patented Apr. 29, 1969

1

3,441,773
MERCURY VAPOR RECTIFIER HAVING A POTENTIAL CONTROL ELECTRODE IN LEAD-IN STRUCTURE

Karl Roth, Nussbaumen, Aargau, Elmar Anwander, Baden, and Max-Josef Schonhuber, Zurich, Switzerland, assignors to Aktiengesellschaft Brown, Boveri & Cie., Baden, Switzerland, a joint-stock company Filed July 1, 1966, Ser. No. 562,172
Claims priority, application Switzerland, July 15, 1965, 9,960/65
Int. Cl. H01j 13/20
U.S. Cl. 313—163 3 Claims

ABSTRACT OF THE DISCLOSURE

A mercury vapor rectifier structure features an anode structure which terminates in an enlarged head, the head being surrounded at a uniform distance by an imperforate grid sleeve which supports a control grid located between the underface of the anode head and the cathode, and there being an electrode disposed intermediate the shank portion of the anode and the grid supporting sleeve for potential control.

The present invention relates to electrical rectifiers of the mercury vapour type and more particularly to an improvement in such a rectifier which comprises an anode supply lead arranged in a lead-in insulator through which also passes a sleeve-shaped grid supply lead and a sleeve-shaped electrode intermediate the anode lead and grid supply sleeve for potential control, the two sleeves being arranged concentrically about the anode lead in radial spaced relation.

It is known that the dielectric strength of mercury vapour rectifier units may be increased by the use of intermediate electrodes arranged between the control grid and the anode. These intermediate electrodes bring about a distribution of the anode blocking voltage that is to a greater, or lesser, extent uniform in accordance with the separate part-capacities, and accordingly the flash-over potential is increased. Hitherto, they have been arranged either in the form of grids, analogous to control grids, spaced axially between the control grid and the anode, or as cylindrical sleeves surrounding the cylindrical anode concentrically.

These arrangements have the disadvantage that the electric potential of the separate intermediate grids during the blocking period is influenced to a greater or lesser extent by the residual charge carriers present around the face of the anode, with the result that the even distribution of voltage striven for by the substantially evenly distributed part-capacities is disturbed. In order to prevent or reduce these disturbing influences, the potential of the intermediate electrodes could be fixed by external voltages or by capacitative wiring, but these measures increase the electric losses or require additional costs and greater space requirements. Intermediate grids arranged between the anode and the control grid can also increase the electric arc losses, or if cylindrical intermediate electrodes are extended up to the anode head, the anode end-face may be narrowed, with the result that loading capacity is reduced.

With increased voltages, care must be taken that the dielectric strength, in particular above the anode in the lead-in insulator, is higher than that of the discharge space between anode and the control grid, since flash-overs in the vicinity of the insulator can lead to a premature ageing of the rectifier and to its being rendered useless.

To overcome the disadvantages of the prior known expedients for increasing the dielectric strength of mercury vapour type rectifiers, the present invention provides a comparatively simple and low-cost approach for preventing, or at least reducing the penetration of the charge carriers into the space between the anode lead-in shank and surrounding grid sleeve. In accordance with the invention, the desired objective is attained by a construction wherein the anode lead-in shank terminates in an enlarged head portion, the grid sleeve surrounding this head portion has a configuration or shape corresponding to that of the head portion so as to maintain a uniform distance therebetween, and the end of the potential control electrode sleeve intermediate the grid sleeve and anode lead-in shank terminates in a thickened, or beaded portion which is radially aligned with a correspondingly configured peripheral recess in the anode lead-in shank and a correspondingly configured peripheral bulge in the wall of the grid sleeve.

In the accompanying drawings:

FIG. 1 shows a portion of the improved mercury vapour rectifier unit according to the present invention; and FIG. 2 shows an alternative form of electrode assembly for use in the unit of FIGURE 1.

In carrying the invention into effect according to one convenient mode by way of example, FIGURE 1 shows a portion of the wall 1 of a mercury vapour rectifier unit, in which is installed a lead-in insulator 2. Through the lead-in insulator 2 passes the shank 3 of an anode constituted by an enlargement at the end of the shank forming an anode head 4 having a planar underface. Due to this enlargement of the anode head 4, charge carriers from the discharge space underneath the anode head are substantially shielded from the insulation space inside the lead-in insulator 2. A planar control grid spaced from the underface of anode head 4 is shown at 5 and is arranged to be supplied by means of an imperforate sleeve 6 extending through the insulation space inside the insulator 2. The shape of the control grid 5 and its sleeve 6 conforms with the shape of the anode head 4 and shank 3 so as to further reduce the penetration of charge carriers. An intermediate electrode 9 is interposed between the anode shank 3 and the grid sleeve 6 for the purpose of potential control. The intermediate electrode 9 has a thickened or beaded portion 7 at the lower end for preventing concentrations of lines of force, and to prevent the electrical distance between the grid sleeve 6 and the anode shank 3 being reduced by this portion 7, the grid sleeve 6 has an annular bulge as at 8, and the anode shank 3 is provided with a corresponding peripheral recess 3*a*. In contrast to the known forms, the control electrode 9 does not need to be supplied with any special control voltage, and accordingly it is not necessary to bring it out of the insulator. It is also possible to provide a plurality of such intermediate electrodes, in which case the associated bulges must be arranged in staggered relationship with respect to each other. With this arrangement practically all charge carriers are shielded from the lead-in space as a result of the shaping of the free spaces. As a result of impact with the wall, recombination of the charges of the charge carriers is made possible. As a result of the beaded end portion 7 of the electrode 9, and the bulging of the grid sleeve 6, the field is evenly distributed at all places because of the uniform spacing.

It is not necessary for the cross-section of the anode head, in a plane parallel with the anode lead axis, to be rectangular, since the effect described above can also be increased by the modified construction shown in FIG. 2 wherein the widened anode head 4′ has, on the discharge side a circular face 4*a* perpendicular to the anode feed lead, shank 3′, a cylindrical side face 4*b*, parallel to anode lead 3′, and a back face 4*c* disposed at an acute angle to the side face thereby to establish a back surface in the form of a hollow cone.

We claim:

1. In a rectifier of the mercury vapour type, the combination comprising a lead-in insulator sleeve located over an opening in a wall of the rectifier, an anode having a lead-in shank located within said insulator sleeve and which terminates within the rectifier in an enlargement constituting an anode head, a planar control grid located within the rectifier in spaced relation to a planar underface of said anode head, an imperforate grid sleeve for supporting said control grid, said grid sleeve including a lead-in portion located within said insulator sleeve between the latter and said lead-in anode shank and co-axial therewith, said grid sleeve further including a second portion surrounding said anode head and of like configuration to establish a uniform spacing therebetween, and an intermediate electrode for potential control in the form of a sleeve and which is located intermediate said lead-in grid sleeve portion and said lead-in anode shank and co-axial therewith, said intermediate electrode sleeve terminating in a thickened end such as a bead and which is in alignment with a correspondingly configured peripheral recess in said lead-in anode shank and also in alignment with a corresponding configured peripheral bulge in the lead-in grid sleeve portion, thereby to at least reduce the penetration of charge carriers into the space between said anode shank and gride sleeve.

2. A mercury vapour type rectifier as defined in claim 1, wherein a cross-section of said anode head in a plane parallel with the anode lead axis has a rectangular configuration and the portion of said grid sleeve correlated therewith is also of rectangular configuration to maintain the uniform spacing therebetween.

3. A mercury vapour type rectifier as defined in claim 1, wherein the underface of said anode head has a circular configuration and is perpendicular to its lead-in shank, a cylindrical side face parallel to said lead-in shank and a back face disposed at an acute angle to said side face thereby to establish a back surface in the form of a hollow cone.

References Cited

UNITED STATES PATENTS

| | | | |
|---|---|---|---|
| 2,447,637 | 8/1948 | Colaiaco | 313—167 X |
| 2,451,938 | 10/1948 | Garbuny et al. | 313—167 X |
| 2,461,275 | 2/1949 | Herskind | 313—167 X |
| 2,871,391 | 1/1959 | Schade | 313—240 X |
| 3,323,002 | 5/1967 | Lafferty | 313—231 X |

JAMES W. LAWRENCE, *Primary Examiner.*

PALMER C. DEMEO, *Assistant Examiner.*

U.S. Cl. X.R.

174—50.59; 313—167, 206, 242